United States Patent
Yuan et al.

(10) Patent No.: US 10,002,160 B2
(45) Date of Patent: Jun. 19, 2018

(54) PARALLELIZABLE GRIDDED GEOSPATIAL JOIN (PGGJ)

(71) Applicant: Teradata US, Inc., Dayton, OH (US)

(72) Inventors: Heng Yuan, San Diego, CA (US);
Daniel Wong, San Diego, CA (US);
Congnan Luo, San Diego, CA (US);
Guilian Wang, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 573 days.

(21) Appl. No.: 14/579,697

(22) Filed: Dec. 22, 2014

(65) Prior Publication Data

US 2015/0178352 A1 Jun. 25, 2015

Related U.S. Application Data

(60) Provisional application No. 61/920,012, filed on Dec. 23, 2013.

(51) Int. Cl.
*G06F 17/30* (2006.01)

(52) U.S. Cl.
CPC .. *G06F 17/30498* (2013.01); *G06F 17/30241* (2013.01); *G06F 17/30327* (2013.01)

(58) Field of Classification Search
USPC ........................................ 707/610, 797, 714
See application file for complete search history.

(56) References Cited

U.S. PATENT DOCUMENTS

| | | | |
|---|---|---|---|
| 6,484,179 B1 * | 11/2002 | Roccaforte | G06F 17/30592 707/737 |
| 7,386,561 B1 | 6/2008 | Ramesh et al. | |
| 7,640,257 B2 | 12/2009 | Watzke | |
| 8,473,483 B2 | 6/2013 | Teletia et al. | |
| 8,812,484 B2 | 8/2014 | Al-Omari et al. | |
| 2003/0212650 A1 * | 11/2003 | Adler | G06F 17/30259 |
| 2006/0129529 A1 * | 6/2006 | Adler | G06F 17/30592 |
| 2009/0043726 A1 * | 2/2009 | Watzke | G06F 17/30592 |
| 2012/0054174 A1 * | 3/2012 | Gagnier | G06F 17/30522 707/714 |
| 2014/0297585 A1 * | 10/2014 | Chawda | G06F 17/30545 707/610 |

OTHER PUBLICATIONS

Patel, Jignest M., et al., "Partition Based Spatial-Merge Join", [online]. [Retrieved on Dec. 22, 2014]. Retrieved from the Internet: <URL: http://pages.cs.wisc.edu/~dewitt/includes/paradise/spjoin.pdf> SIGMOD, (1996), 1-12.

* cited by examiner

*Primary Examiner* — Cam-Linh Nguyen
(74) *Attorney, Agent, or Firm* — Schwegman, Lundberg & Woessner, P.A.

(57) ABSTRACT

Statistics for a Relational Database Management System (RDBMS) set of tables are normalized and a grid computed. A particular grid cell having above threshold number of entries from the tables is determined and an R-Tree is dynamically constructed for that grid cell for use when performing a geospatial join operation against the tables.

20 Claims, 3 Drawing Sheets

PARALLELIZABLE GRIDDED GEOSPATIAL JOIN (PGGJ)

RELATED APPLICATIONS

The present application claims priority to, and is a non-provisional application of Provisional Application No. 61/920,012 entitled: "Techniques for Parallelized Gridded Geospatial Join," filed on Dec. 23, 2013; the disclosure of which is hereby incorporated by reference in its entirety herein and below.

BACKGROUND

A geospatial join is a costly operation is typically handled like a product join in a relational database system. For example, in the geospatial join query below:
SELECT*
FROM Store, State
WHERE Store.location.ST_WITHIN (State.geo)=1;

The typical approach is to do a full product join on the Store and State table, then filter the result with the geospatial join predicate.

Some existing techniques have a geospatial nested join algorithm that works as follows: assuming that there is a geospatial index on the store location (Store.location), a state table on all Application Module Processors (AMPs) of a multiprocessor architecture, the geospatial index on Store.location is processed to narrow down the rows that would satisfy the geospatial join predicate.

However, this approach is still costly. One of the tables (state in the case above) must be fully duplicated on all AMPs. This operation is very costly in terms of both spool space and transmission cost. A lot of time elapses when both tables are large, and the system may not have enough spool space to accommodate such a join. The problem is exacerbated as the number of AMPs in a multiprocessor relational database management (RDBMS) architecture increases.

Additionally, the approach mentioned above has to execute other single table predicates on Store table AFTER the index search on the Store.location. This is despite the possibility of more restrictive single table predicates that could occur on the store table (for instance via a different index).

Therefore, there is a need for improved geospatial join processing within a RDBMS.

SUMMARY

In various embodiments, techniques and a system for performing parallelized gridded geospatial joins are presented. According to an embodiment, a method for performing a parallelized gridded geospatial join is provided.

Specifically, statistics for a first table and a second table associated with a join operation are normalized. A grid is generated from the normalized statistics and a grid cell is identified that has more than a threshold number of entries from both the first table and the second table. Finally, an R-Tree for the grid cell is dynamically constructed to assist in performing the join operation.

DETAILED DESCRIPTION

Figure 1:
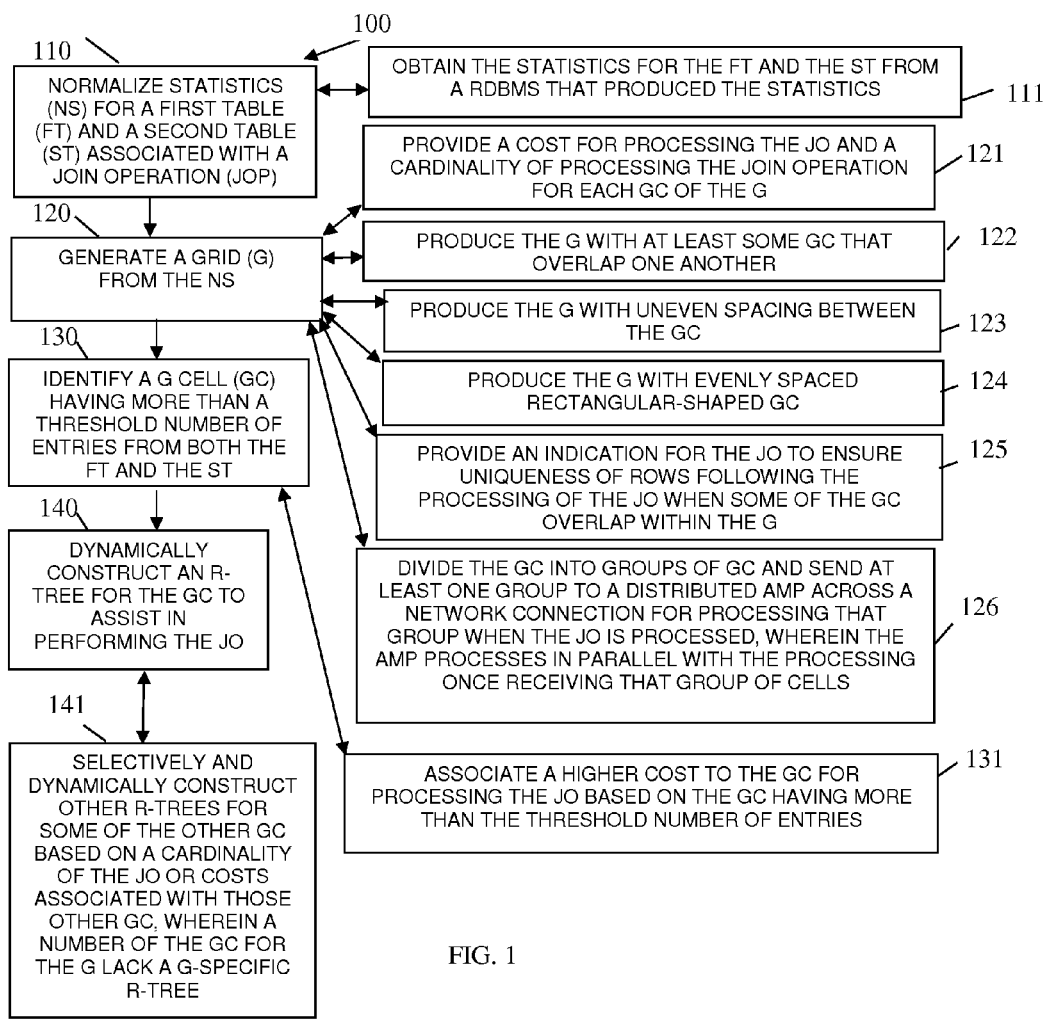
FIG. 1 is a diagram of a method for performing a parallelized gridded geospatial join, according to an example embodiment.

It is to be noted that the techniques presented herein are implemented as executable instructions that are programmed in memory or non-transitory computer-readable storage media (or medium) for execution on one or more processing devices, each processing device having one or more processors, and each processor specifically configured to execute the executable instructions.

As will be demonstrated herein, a new novel geospatial join processing technique is presented referred to as "Parallelized Gridded Geospatial Join" (PGGJ) that eliminates such massive table duplication (as mentioned above). The novel technique also works without having to pre-build the R-Tree (tree data structures for spatial access methods).

It is to be understood that Parallelizable Gridded Geospatial Join (PGGJ) can in some instances work similar to Hash Joins.

In a hash join, A×B on A.x=B.x, Both A.x and B.x are partitioned by their hash values. Then, within each hash partition, a product join is performed for A.x and B.x in the same hash partition. Because each hash partition is small, the actual product join that needs to be performed within each hash partition is small. As the result, the overall join performance is significantly faster than a full product join.

Likewise, in PGGJ where A×B on A.geo.ST_INTERSECTS (B.geo)=1 (or similar geospatial join predicates), statistics are used to come up with a grid G. Both A.geo and B.geo are put into the grid cells of G where its Minimum Bounded Rectangle (MBR) intersects. Thus, an A.geo object can be put into two or more grid cells, depending on how many grid cells its MBR could intersect. Then, product joins are processed for A.geo and B.geo in the same grid cell. As a result, the overall join operations are much faster than a full product join.

Gridded Computation

For a geospatial join on table A geo column and table B geo column, normalized statistics from the statistics are computed on A.geo and B.geo. From these normalized statistics, the grid cells needed for PGGJ are computed, as well as an estimate of the join cardinality and a cost for each grid cell.

In the PGGJ, the grid G does not need to be evenly spaced. It should be restricted to rectangular shape; although it does not have to be. It is also possible for some grid cells to be overlapping. For simplicity, however, evenly spaced rectangular shaped grid cells are generated.

Duplicate Join Result Elimination

Unlike partitioned join algorithms, in PGGJ approaches discussed herein, it is possible that an object in A.geo overlaps multiple grid cells, and an object in B.geo overlaps the same multiple grid cells. As the result, there exists the possibility of duplicate join results from A and B.

The duplicate results are eliminated by ensuring the uniqueness of the join pair row ids.

It should be noted that if any of the table are point data and the grid cells are non-overlapping, it is then not necessary to perform the duplicate elimination.

Parallelizable and Scalable with the Number of AMPs in the RDBMS

The PGGJ techniques described herein are easily parallelizable, by letting different AMPs handle different grid cells. Depending on the load and join cost, the query optimizer can determine which AMP can handle which grid cells.

In most cases where a geometry object only gets put in a single grid cell, the object is transmitted to an AMP once. Occasionally, an object may be put into multiple grid cells; the number of transmission and occupied is increased accordingly.

The join cost is independent from the number of AMPs in the RDBMS system. Thus, the algorithm scales very well with the number of AMPs in the RDBMS system.

Novel Improvement with Dynamic R-Tree Construction

When a grid cell has high number of entries from both tables that participate in the join operation, an R-tree is dynamically constructed for the particular grid cell, to make the geospatial join performance within the grid cell process faster.

In some cases, since dynamically constructing the R-tree does incur some processing overhead, it may not necessarily be useful for all grid cells to dynamically construct the R-tree. So, the dynamic R-tree construction can be processed by checking the number of actual entries from both tables for the particular grid cell at run time against a threshold set by the query optimizer.

It is noted that in Partitioned Based Spatial Join Merge (PBSJM) approaches, the partitions are generated from a plane sweeping technique. Their portioning mechanism using tiles causes loss of geospatial locality of objects in each partition; this causes waste on sorting and merging on the filtering step.

In the novel PGGJ techniques presented herein, the "partitions" or grids are generated from statistics before the joins are actually performed. The grids do not need to be uniform, can have some big partitions for sparse area and small partitions for dense area. Additionally, the shapes can be arbitrary to avoid too many replications when there are many objects go cross multiple regular partitions. Moreover, generating grid from statistics is also more processor efficient with the presented PGGJ techniques when compared to plane sweeping approaches.

In PBSJM approaches, there also exists a memory constraint in the plane-sweeping technique.

There is no such requirement for statistics based grid generation presented herein. Furthermore, if the statistics showed that one relation contains mostly point data (such as customer locations), fine grid cells can be generated as the statistics allow. For example, when geospatial statistics store the type of data, if one relation is mostly point data, there is no need to have to worry about creating too many duplicate join results when a lot of grid cells for a dense region are created. On the other hand, and if necessary, such as if both relations involved in joins are big polygons in a given region, then sub-dividing this region much may be avoided, since doing so creates may result in a lot of duplicated join results. So, the PGGJ approaches presented herein are constrained by the data of the RDBMS and not constrained by available memory on a multiprocessor architecture.

Moreover, the PBSJM approaches use a partitioned grid, which is not all that necessary; given the fact that duplicate elimination has to be performed, in some cases. So, relaxing the partition restriction (in the PGGJ approached herein) allows non-linear stats (such as slanted clustering based geospatial stats) to generate better grid cells than rectangular tiles. For instance, the statistics of the PGGJ approaches can indicate that there are two clusters running in diagonal directions. Moreover, with the PGGJ approaches there can be grid cells that contain minor overlaps, but it can be deemed okay if it does not generate too many duplicates and it simplifies computations.

The novel PGGJ techniques presented herein allow for a significant performance boost to joins involving geospatial join predicates. Further, the novel PGGJ techniques are:

1) scalable and parallelizable with respect to the number of AMPs in the RDBMS system (can be used in a parallel environment of on a single machine RDBMS);

2) achieve significantly reductions in transmission and space (memory and/or storage) costs;

3) compatible with nested join algorithms, so it is permissible for single predicates to be applied first before the PGGJ techniques are applied; and 4) achievable, as needed, with dynamic construction of the R-tree to further improve the join performance.

It is to be noted that the techniques presented herein are implemented as executable instructions that are programmed in memory or non-transitory computer-readable storage media (or medium) for execution on one or more processing devices, each processing device having one or more processors, and each processor specifically configured to execute the executable instructions.

Figure 2:
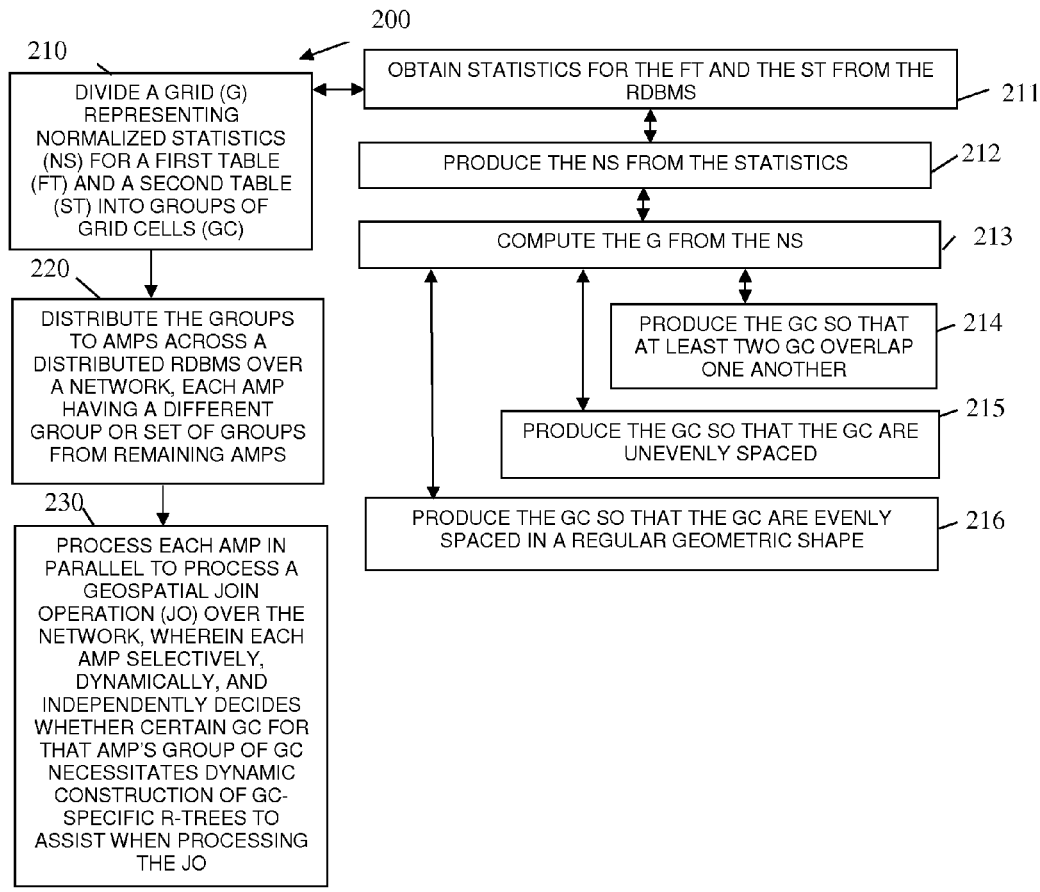
FIG. 2 is a diagram of another method for performing a parallelized gridded geospatial join, according to an example embodiment.
Figure 3:
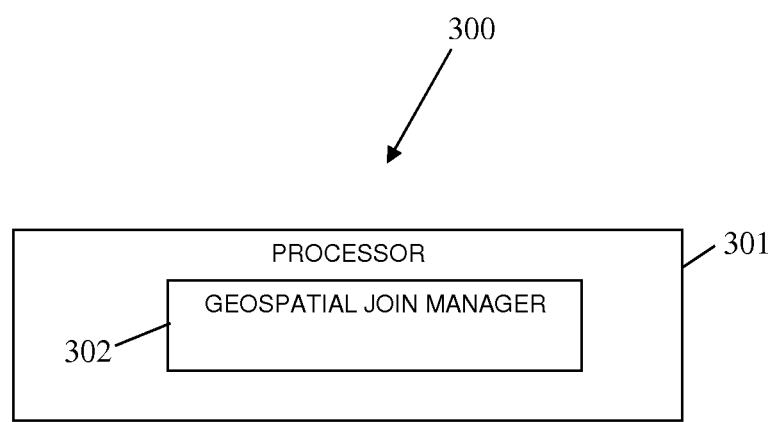
FIG. 3 is a diagram of a parallelized gridded geospatial join processing system, according to an example embodiment.

These embodiments and other embodiments are now presented with the discussion of the FIGS. 1-3.

FIG. 1 is a diagram of a method 100 for performing a parallelized gridded geospatial join, according to an example embodiment. The method 100 (hereinafter "geospatial join controller") is implemented as executable instructions that are programmed and reside within memory and/or non-transitory computer-readable storage media for execution on processing nodes (processors/AMPs) of a network; the network wired, wireless, and/or a combination of wired and wireless.

In an embodiment, the geospatial join controller executes on one or more AMPs of a RDBMS.

In an embodiment, the RDBMS is a distributed database system.

In an embodiment, the RDBMS is a single machine non-parallelized RDBMS.

At 110, the geospatial join controller normalizes statistics for a first table and a second table. The normalized statistics are associated with a geospatial join operation (herein after just "join operation").

According to an embodiment, at 111, the geospatial join controller obtains the statistics for the first table and the second table from a RDBMS that produced the statistics. That is, the geospatial join controller does not produce the statistics, but rather, produces the normalized statistics.

At 120, the geospatial join controller generates or computes a grid from the normalized statistics. This can be done in a variety of manners, some of which were detailed above.

In an embodiment, at 121, the geospatial join controller provides a cost for processing the join operation and a cardinality of processing the join operation for each grid cell of the grid.

In an embodiment, at 122, the geospatial join controller produces the grid with at least some of the grid cells that overlap one another. This may be an indication of duplication when the join operation is processed as discussed above.

In an embodiment, at 123, the geospatial join controller produces the grid with uneven spacing between the grid cells.

In an embodiment, at 124, the geospatial join controller produces the grid with evenly spaced rectangular-shaped grid cells.

In an embodiment, at 125, the geospatial join controller provides an indication for the join operation to ensure uniqueness of rows following the processing of the join operation when some of the grid cells overlap within the grid. This can be remedied by the join operation ensuring the result set has unique row identifiers.

According to an embodiment, at 126, the geospatial join controller divides the group cells into groups of group cells and sends at least one group to a distributed AMP across a network connection for processing that group of grid cells when the join operation is processed. The AMP also processes in parallel with the processing of the geospatial join controller once the group of grid cells is received by the AMP.

At 130, the geospatial join controller identifies a particular grid cell having more than a threshold number of entries from both the first table and the second table.

According to an embodiment, at 131, the geospatial join controller associates a higher cost to the particular grid cell for processing the join operation based on that grid cell having more than the threshold number of entries. This may also be based on the cardinality of the join operation processing against the grid cell.

At 140, the geospatial join controller dynamically constructs an R-Tree for the grid cell to assist in more efficiently processing the join operation.

According to an embodiment, at 141, the geospatial join controller selectively and dynamically constructs other R-Trees for some of the other grid cells based on a cardinality of the join operation for those other grid cells or costs associated with those other grid cells. A number of the remaining grid cells of the grid lack or do not have a constructed grid cell-specific R-Tree.

FIG. 2 is a diagram of another method 200 for performing a parallelized gridded geospatial join, according to an example embodiment. The method 200 (hereinafter "geospatial join manager") is implemented as executable instructions within memory and/or non-transitory computer-readable storage media that execute on one or more processors (nodes), the processors specifically configured to geospatial join manager. The geospatial join manager is also operational over a network; the network is wired, wireless, or a combination of wired and wireless.

In an embodiment, the geospatial join manager presents another and in some ways enhanced processing perspective to the geospatial join controller presented above with reference to the FIG. 1.

At 210, the geospatial join manager divides a grid representing normalized statistics for a first table and a second table into groups of grid cells.

In an embodiment, at 211, the geospatial join manager obtains statistics for the first table and the second table from the RDBMS.

In an embodiment of 211 and at 212, the geospatial join manager produces the normalized statistics from the statistics obtained from the RDBMS.

In an embodiment of 212 and at 213, the geospatial join manager computes the grid from the normalized statistics as was discussed above.

In an embodiment of 213 and at 214, the geospatial join manager produces the grid cells so that at least two grid cells overlap one another.

In an embodiment of 213 and at 215, the geospatial join manager produces the grid cells so that the grid cells are unevenly spaced apart from one another.

In an embodiment of 213 and at 216, the geospatial join manager produces the grid cells so that the grid cells are evenly spaced in a regular geometric shape.

At 220, the geospatial join manager distributes groups of the grid cells to AMPs across a distributed RDBMS over a network. Each AMP having a different group of grid cells or set of groups of grid cells from remaining AMPs of the RDBMS network.

At 230, the geospatial join manager processes each AMP in parallel to process the join operation over the network. Each AMP selectively, dynamically, and independently decides whether certain grid cells for that AMP's group of group cells necessitates dynamic construction of grid cell-specific R-Trees to assist when processing the join operation. It is noted that not all grid cells require or will have R-Trees associated with those grid cells, as discussed above.

FIG. 3 is a diagram of a parallelized gridded geospatial join processing system 300, according to an example embodiment. Some components of the parallelized gridded geospatial join processing system 300 are implemented as executable instructions that are programmed and reside within memory and/or non-transitory computer-readable storage medium that execute on processing nodes of a network. The network is wired, wireless, or a combination of wired and wireless.

In an embodiment, parallelized gridded geospatial join processing system 300 implements, inter alia, the techniques presented above with the method 100 of the FIG. 1.

In an embodiment, the parallelized gridded geospatial join processing system 300 implements, inter alia, the techniques presented above with the method 200 of the FIG. 2.

In an embodiment, the parallelized gridded geospatial join processing system 300 implements, inter alia, the techniques presented above with the methods 100 and 200 of the FIGS. 1-2.

The parallelized gridded geospatial join processing system 300 includes a processor 301 and a geospatial join manager 302.

The processor 301 is part of a RDBMS.

The geospatial join manager 302 is adapted and configured to: execute on the processor 301, compute a grid for normalized statistics associated with a first table and a second table associated with a geospatial join operation of a RDBMS, and selectively constructing a grid cell-specific R-Tree for selective grid cells of the grid to assist when processing the geospatial join from the grid.

According to an embodiment, the geospatial join manager 302 is further configured to: assign a cost and a cardinality of the geospatial join operation associated with each grid cell of the grid.

In an embodiment of the latter embodiment, a particular grid cell having a highest cost in view of remaining grid cells for the grid has a grid cell-specific R-Tree constructed by the geospatial join manager 302.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:
1. A method, comprising:
normalizing statistics for a first table and a second table associated with a join operation of a Relational Database Management System (RDBMS);
generating a grid from the normalized statistics;

identifying a grid cell having more than a threshold number of entries from both the first table and the second table; and dynamically constructing an R-tree for the grid cell based on determining that a total number of entries from the first table and the second table within the grid cell that exceeds a second threshold; and processing the join operation from the R-tree of the grid cell in place of existing join processing that the RDBMS would have processed on the first table and the second table by reducing table duplication and ensuring uniqueness of join pair row identifiers when joining the first table and the second table from the R-Tree.

2. The method of claim 1, wherein normalizing further includes obtaining the statistics for the first table and the second table from the RDBMS that produced the statistics.

3. The method of claim 1, wherein generating further includes providing a cost for processing the join operation and a cardinality of processing the join operation for each grid cell of the grid.

4. The method of claim 1, wherein generating further includes producing the grid with at least some grid cells that overlap one another.

5. The method of claim 1, wherein generating further includes producing the grid with uneven spacing between the grid cells.

6. The method of claim 1, wherein generating further includes producing the grid with evenly spaced rectangular-shaped grid cells.

7. The method of claim 1, wherein generating further includes providing an indication for the join operation to ensure uniqueness of rows following the processing of the join operation when some of the grid cells overlap within the grid.

8. The method of claim 1, wherein generating further includes dividing the grid cells into groups of cells and sending at least one group to a distributed access module processor (AMP) across a network connection for processing that group when the join operation is processed, wherein the AMP processes in parallel with the method once receiving that group of cells.

9. The method of claim 1, wherein identifying further includes associating a higher cost to the grid cell for processing the join operation based on the grid cell having more than the threshold number of entries.

10. The method of claim 1, wherein dynamically constructing further includes selectively and dynamically constructing other R-Trees for some of the other grid cells based on a cardinality of the join operation or costs associated with those other grid cells, wherein a number of the grid cells for the grid lack a grid-specific R-Tree.

11. A method, comprising:

dividing a grid representing normalized statistics for a first table and a second table into groups of grid cells;

distributing the groups to Access Module Processors (AMPs) across a distributed Relational Database Management System (RDBMS) over a network, each AMP having a different group or set of groups from remaining AMPs; and processing each AMP in parallel to process a geospatial join operation over the network, wherein each AMP selectively, dynamically, and independently decides whether certain grid cells for that AMP's group of grid cells necessitates dynamic construction of grid cell-specific R-Trees and the geospatial join operation from the grid cell-specific R-Trees of the certain grid cells based on a total number of entries for the first table and the second table within each of the certain grid cells that exceeds a threshold, and wherein processing further includes the geospatial join operation in place of existing join processing that the RDBMS would have processed on the first table and the second table by reducing table duplication and ensuring uniqueness of join pair row identifiers when joining the first table and the second table from the R-Trees.

12. The method of claim 11, wherein dividing further includes obtaining statistics for the first table and the second table from the RDBMS.

13. The method of claim 12, wherein obtaining further includes producing the normalized statistics from the statistics.

14. The method of claim 13, wherein producing further includes computing the grid from the normalized statistics.

15. The method of claim 14, wherein computing further includes producing the grid cells so that at least two grid cells overlap one another.

16. The method of claim 14, wherein computing further includes producing the grid cells so that the grid cells are unevenly spaced.

17. The method of claim 14, wherein computing further includes producing the grid cells so that the grid cells are evenly spaced in a regular geometric shape.

18. A system, comprising:

a processor; and a geospatial join manager configured to: i) execute on the processor, ii) compute a grid for normalized statistics associated with a first table and a second table associated with a geospatial join operation of a Relational Database Management System (RDBMS), and iii) selectively constructing a grid cell-specific R-Tree for selective grid cells of the grid based on a total number of entries for the first table and the second table within each selective grid cell and exceeds a threshold, and process the geospatial join from the grid cell-specific R-Tree of the grid in place of existing join processing that the RDBMS would have processed on the first table and the second table by reducing table duplication and ensuring uniqueness of join pair row identifiers during a join of the first table and the second table from the R-Tree.

19. The system of claim 18, wherein the geospatial join manager is further configured to:

iv) assign a cost and a cardinality of the geospatial join operation associated with each grid cell of the grid.

20. The method of claim 19, wherein a particular grid cell having a highest cost in view of remaining grid cells for the grid has a grid cell-specific R-Tree constructed by the geospatial join manager.

* * * * *